United States Patent [19]

Richartz et al.

[11] Patent Number: 4,539,166
[45] Date of Patent: Sep. 3, 1985

[54] PROCESS FOR THE PRODUCTION OF A LIGHTFAST AND COLORFAST COMPOSITE PLASTIC PART

[75] Inventors: Adolf Richartz, Cologne; Wolfgang Reichmann, Hilden; Ulrich Knipp, Bergisch Gladbach, all of Fed. Rep. of Germany

[73] Assignee: Bayer Aktiengesellschaft, Leverkusen, Fed. Rep. of Germany

[21] Appl. No.: 491,692

[22] Filed: May 5, 1983

[30] Foreign Application Priority Data

May 19, 1982 [DE] Fed. Rep. of Germany ....... 3219039

[51] Int. Cl.$^3$ .............................................. B29D 27/04
[52] U.S. Cl. ................................. 264/45.1; 264/46.4; 264/DIG. 83
[58] Field of Search ............. 264/45.1, DIG. 83, 46.4

[56] References Cited

U.S. PATENT DOCUMENTS 3,954,926 5/1976 Pahl et al. .......................... 264/46.4
4,081,578 3/1978 Van Essen et al. ............. 264/255 X

*Primary Examiner*—Philip Anderson
*Attorney, Agent, or Firm*—Gene Harsh; Joseph C. Gil

[57] ABSTRACT

A first reaction mixture, prepared from (a) aromatic isocyanates with isocyanate contents of from 5 to 50%, and (b) compounds with molecular weights of from 32 to 10,000 which contain at least two isocyanate-reactive hydrogen atoms, in an equivalent ratio of component "a" to component "b" of 0.8:1 to 5:1, from 0.1 to 20% of a blowing agent and, optionally, other known additives, is introduced into a closed mold with a rigid cavity. After this mixture has become resistant to permeation, but is still compressible, a second reaction mixture, prepared from (c) aliphatic and/or cycloaliphatic polyisocyanates having isocyanate contents of from 5 to 50% and (d) compounds with molecular weights of from 32 to 10,000 which contain at least two isocyanate-reactive hydrogen atoms, in an equivalent ratio of component "c" to component "d" of from 0.8:1 to 5:1, an internal mold release agent and optionally blowing agents and other additives, is introduced into the mold, such that the second mixture surrounds the first mixture and compresses it. A third, optional, reaction mixture, the same as or different from the second mixture, may also be employed in a manner similar to the introduction of the second mixture. The final composite plastic part releases smoothly from the mold and evidences good lightfast and colorfast properties.

11 Claims, 1 Drawing Figure

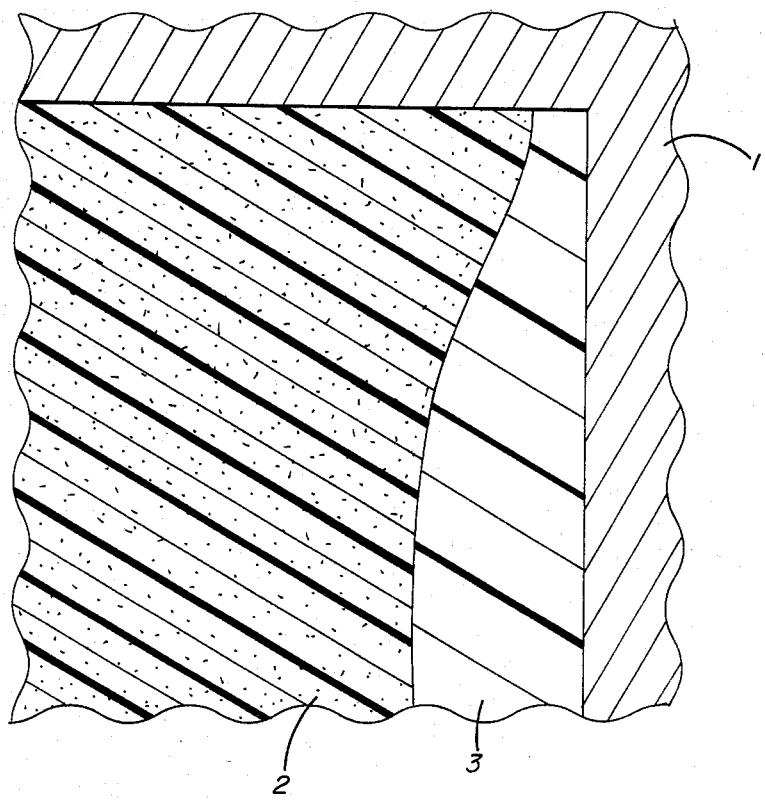

4,539,166

PROCESS FOR THE PRODUCTION OF A LIGHTFAST AND COLORFAST COMPOSITE PLASTIC PART

This invention relates to a process for the production of a weather-resistant, lightfast and colorfast composite part of cellular plastic which contains urethane and/or isocyanurate groups, by the successive introduction of two or more reaction mixtures into a closed mold with a rigid cavity, in which the previous mixture is allowed to completely react in the cavity before a subsequent mixture is introduced into the mold. In this process, elaborate after-treatment measures, such as removal of mold release agents by a bath of solvent vapor, followed by lacquering are unnecessary.

BACKGROUND OF THE INVENTION

Processes for the production of composite plastic parts, e.g., with a cellular core and a solid surface layer, are already known.

A process described in German Auslegeschrift No. 2,127,582 is said to result in composite parts with cellular cores and flawless non-cellular surfaces, by the successive introduction of several substances into a closed mold having a rigid cavity. In this process, at least one foamable plastic charge and a second plastic charge which may be either foamable or unfoamable are used, with the second charge forming the part's surface after compression of the first charge. The time sequence is chosen such that the second charge will not permeate the first charge but will compress the first charge according to its mass or volume, and form a good chemicophysical bond with the first filling, because the first charge is not yet fully reacted and has still a sufficient tackiness and is still compressable.

This process has made obsolete the practice of "wrapping" (enclosing) a polymer which contains a blowing agent with a polymer which does not contain a blowing agent. It is also no longer necessary to expand the cavity of a mold, by enabling the mold to "breathe" (see German Auslegeschrift No. 2,442,227), in order to produce a composite plastic article.

In German Auslegeschrift No. 2,127,582, three examples describe combinations of polyurethane plastics of differing structure and hardness, as well as combinations of polyurethane plastics with polymerization and polycondensation plastics. These examples are limited to a description of the process of filling the cavity of the mold, in which the number and position of the mixing heads used may vary. Thus, composite parts produced from a first charge of a foamable polyurethane foam, which should have facilitated release from the mold due to its hardness, and a second charge of a foamable or elastomeric lightfast, colorfast, weather-resistant polyurethane plastic could not be removed from the mold cavity without damage to the composite part.

It is an object of the present invention to provide a process for the production of a lightfast, colorfast, weather-resistant composite part from cellular plastics containing urethane and/or isocyanurate groups, which releases from the mold without difficulties. This problem is solved by the present invention.

BRIEF DESCRIPTION OF THE DRAWING

The FIGURE represents an embodiment of the present invention.

DESCRIPTION OF THE INVENTION

The present invention relates to a process for the production of a lightfast and colorfast composite part of cellular plastic which contains urethane and/or isocyanurate groups, by the successive introduction of two or more reaction mixtures into a closed mold having a rigid cavity, at least the first layer being foamed. In this process, after introduction of a first foamable reaction mixture, a second optionally-foamable reaction mixture is introduced into the mold after the first charge has at least reached a state at which it is resistant to being permeated but is still compressible, such that the second mixture surrounds the first layer and compresses it. After the second reaction mixture has become resistant to permeation, but is still compressible, a third reaction mixture may, optionally, be introduced into the rigid cavity, such that it surrounds the second mixture and compresses the composite of the first and second mixtures.

The process is more particularly characterized in that a first reaction mixture, comprising one or more aromatic isocyanates having isocyanate contents of from 5 to 50%, by weight: one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1; from 0.1 to 20%, by weight (based on the reaction mixture), of a blowing agent comprising a compound which releases $CO_2$; in the presenoe of an internal and/or external mold release agent, and conventional auxiliary agents and additives, is introduced into the rigid cavity of a closed mold. After this first reaction mixture has at least become resistant to permeation, but is still compressible, a second reaction mixture is introduced into the cavity, such that the second mixture surrounds the first mixture and compresses it, this second mixture comprising aliphatic, cycloaliphatic, or a combination of aliphatic and cycloaliphatic polyisocyanates having isocyanate contents of from 10 to 50%, by weight: one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1: an internal mold release agent selected from the group consisting of polysiloxanes, hydroxypolysiloxanes or salts of polysiloxanes containing amino groups with long chain fatty acids; and, optionally, blowing agents and/or conventional auxiliary agents and additives. Optionally, a third reaction mixture, either the same as or different from the second mixture and comprising members from the same groups as comprise the second mixture, may be introduced into the rigid cavity after the second mixture has become resistant to permeation, but is still compressible, such that the third mixture surrounds the second mixture and compresses the composite of the first and second mixtures.

One preferred embodiment of the process according to the instant invention comprises employing a first reaction mixture which contains water, in a quantity of from 0.1 to 10%, by weight (based on the reaction mixture), as blowing agent.

In a second preferred embodiment, a dehydrating agent from the zeolite class of compounds such as sodium aluminosilicate, potassium aluminosilicate or sodium potassium aluminosilicate, which is optionally added in the form of a 50% paste prepared with castor oil, is added to the second and optionally, third (if used) reaction mixtures.

The $CO_2$ released by the blowing agent in the first reaction mixture is then used to regulate the surface porosity of the core in order that a portion of the external mold release agent which is optionally used prior to the first filling process and which reaches the surface of the core can penetrate into the interior of the core and thus ensure optimum adherence between the core and subsequent charges. The remainder of the external mold release agent, which is left on the surface of the cavity of the mold, then facilitates removal of the final composite part from the mold.

For the first reaction mixture, aromatic polyisocyanates, such as those described by W. Siefken in Justus Liebigs Annalen der Chemie, 562, pages 75–136, for example, those of the formula, $Q(NCO)_n$, wherein n denotes 2 to 4, preferably 2, and Q denotes an aromatic hydrocarbon group with 6 to 15, preferably 6 to 13 C-atoms, may be used. Such suitable aromatic isocyanates are also described, for example, in German Offenlegungsschrift No. 2,737,951, pages 24 to 26.

Particularly preferred for the first reaction mixture are generally the commercially-available polyisocyanates, such as 2,4- and 2,6-tolylene diisocyanate and any mixtures of these isomers ("TDI"), polyphenyl polymethylene polyisocyanates which may be prepared by aniline-formaldehyde condensation followed by phosgenation (crude "MDI"), and polyisocyanates containing carbodiimide groups, urethane groups, allophanate groups, isocyanurate groups, urea groups, or biuret groups ("modified isocyanates"). Most particularly preferred are those modified polyisocyanates which are derived from 2,4- and/or 2,6-tolylene diisocyanate or from 4,4'- and/or 2,4'-diphenylmethane diisocyanate. Aliphatic and cycloaliphatic and/or mixed aliphatic-cycloaliphatic polyisocyanates, such as those described by W. Siefken in Justus Liebigs Annalen der Chemie, 562, pages 75 to 135, are used for the second and optional third reaction mixtures. Examples of these suitable isocyanates corresponding to the formula, $Q(NCO)_n$, wherein n denotes 2 to 4, preferably 2, and Q denotes an aliphatic hydrocarbon group having from 2 to 18, preferably from 6 to 10, carbon atoms or a cycloaliphatic hydrocarbon group having from 4 to 15, preferably 5 to 10, C-atoms.

Such suitable isocyanates include ethylenediisocyanate, 1,4-tetramethylenediisocyanate, 1,6-hexamethylene diisocyanate, 1,12-dodecanediisocyanate, cyclobutane-1,3-diisocyanate, cyclohexane-1,3- and -1,4-diisocyanate and any mixtures of these isomers. Other suitable isocyanates include 1-isocyanato-3,3,5-trimethyl-5-isocyanatomethyl-cyclohexane (German Auslegeschrift No. 1,202,785 and U.S. Pat. No. 3,401,190), 2,4- and 2,6-hexahydrotolylene diisocyanate and any mixtures of these isomers, hexahydro-1,3- and/or 1,4-phenylenediisocyanate and perhydro-2,4'- and/or -4,4'-diphenylmethane-diisocyanate.

Suitable compounds containing at least two isocyanate-reactive hydrogen atoms, and generally having molecular weights of from 400 to 10,000, include compounds containing amino, hydroxyl, thiol or carboxyl groups, preferably compounds containing hydroxyl groups. Preferred compounds include those containing 2 to 8 hydroxyl groups, especially those with molecular weights of from 1000 to 10,000, and preferably with molecular weights of from 2000 to 6000. Examples of these compounds include polyesters, polyethers, polythioethers, polyacetals, polycarbonates and polyester amides having at least 2, generally 2 to 8, but preferably 2 to 4 hydroxyl groups, such as the known compounds for the preparation of homogeneous and cellular polyurethanes (see, e.g., German Offenlegungsschrift No. 2,737,951, pages 26 to 29).

The polyhydroxyl compounds may also be modified in various ways before they are put into the polyisocyanate polyaddition process. Thus, according to German Offenlegungsschrift No. 2,210,839 (U.S. Pat. No. 3,849,515) and German Offenlegungsschrift No. 2,544,195, a mixture of different polyhydroxyl compounds (e.g., a polyether and a polyester polyol) may be condensed by etherification, in the presence of a strong acid to form a relatively high molecular weight polyol comprising different segments linked by ether bridges. It is also possible, for example, to introduce amide groups into the polyhydroxyl compounds according to German Offenlegungsschrift No. 2,559,372, or to introduce triazine groups by a reaction with polyfunctional cyanic acid esters according to German Offenlegungsschrift No. 2,620,487. Also, polyhydroxyl compounds containing guanidine, phosphone formamidine or acrylic urea groups (German Offenlegungsschriften Nos. 2,714,289: 2,714,292 and 2,714,293) may be used and are obtained by the reaction of a polyol with less than an equivalent quantity of a diisocyanatocarbodiimide, followed by reaction of the carbodiimide group with an amine, amide, phosphite or carboxylic acid.

In some cases, it is of particular interest to convert the relatively high molecular weight polyhydroxyl compounds partly or completely into the corresponding anthranilic acid esters by reaction with isatoic acid anhydride, as described in German Offenlegungsschriften Nos. 2,019,432 and 2,619,840 and in U.S. Pat. Nos. 3,808,250; 3,975,428 and 4,016,143. By this method, relatively high molecular weight compounds having aromatic amino end groups are obtained.

Relatively high molecular weight compounds containing amino end groups, as obtained by the reaction of isocyanate prepolymers with hydroxyl group-containing enamines, aldimines and ketimines followed by hydrolysis according to German Offenlegungsschrift No. 2,546,536 and U.S. Pat. No. 3,865,791 may be used. Other methods of preparation of relatively high molecular weight compounds containing amino or hydrazide end groups are described in German Offenlegungsschrift No. 1,694,152 (U.S. Pat. No. 3,625,871).

Polyhydroxyl compounds containing high molecular weight polyadducts or polycondensates or polymers in a finely dispersed form or in solution may also be used according to the invention (see, e.g., German Offenlegungsschrift No. 2,737,951, page 31). Polyhydroxyl compounds which have been modified by vinyl polymers, such as the products obtained by the polymerization of styrene and acrylonitrile in the presence of polyethers (U.S. Pat. Nos. 3,383,351: 3,304,273: 3,523,093 and 3,110,695 and German Auslegeschrift No. 1,152,536) or polycarbonate polyols (German Pat. No.

1,769,795 and U.S. Pat. No. 3,637,909) are also suitable for the process according to the invention.

Polymer products with exceptional flame resistance which may be used according to the instant invention are obtained when using polyether polyols which have been modified according to German Offenlegungsschriften Nos. 2,442,101; 2,644,922; and 2,646,141, by graft polymerization with vinyl phosphonic acid esters and optionally acrylonitrile, methacrylonitrile, acrylamide, methacrylamide or OH functional acrylic or methacrylic acid esters. Also, polyhydroxyl compounds into which carboxyl groups have been introduced by radical graft polymerization with unsaturated carboxylic acids and optionally other olefinically-unsaturated monomers (German Offenlegungsschriften Nos. 2,714,291; 2,739,620 and 2,654,746) are particularly advantageous to use in combination with mineral fillers according to the instant invention.

Representatives of the above-mentioned compounds, for use according to the invention, have been described, for example, in High Polymers, Vol. XVI, "Polyurethanes Chemistry and Technology", by Saunders-Frisch, Interscience Publishers, N.Y., London, Vol. I, 1962, pages 32 to 42 and pages 44 to 54 and Vol. II, 1964, pages 5 and 6 and 198 and 199, as well as in Kunststoff-Handbuch, Volume VII, published by Vieweg-Hochtlen, Carl-Hanser-Verlag, Munich, 1966, e.g., on pages 45 to 71. Mixtures of these compounds which have molecular weights of from 400 to 10,000 and which contain at least two isocyanate-reactive hydrogen atoms, for example, mixtures of polyethers and which polyesters may, of course, be used. In some cases, it is particularly advantageous to combine low melting with high melting polyhydroxyl compounds (see German Offenlegungsschrift No. 2,706,297).

Compounds with molecular weights of from 32 to 400 which contain at least two isocyanate-reactive hydrogen atoms may also be used according to the invention. These compounds also contain hydroxyl groups and/or amino groups and/or thiol groups and/or carboxyl groups, preferably hydroxyl groups and/or amino groups, and are used as chain lengthening agents or crosslinking agents. They generally contain from 2 to 8, preferably 2 to 4, isocyanate-reactive hydrogen atoms. Examples of such compounds are mentioned on page 30 of German Offenlegungsschrift No. 2,737,951.

These low molecular weight polyols may be mixtures of hydroxyaldehydes and hydroxyketones ("formoses") or the polyhydric alcohols obtained, by reduction, from hydroxyketones ("formitols"), as, for example, produced in the autocondensation of formaldehyde hydrate in the presence of metal catalysts and of compounds capable of diol-formation as co-catalysts (German Offenlegungsschriften Nos. 2,639,084; 2,714,084; 2,714,104; 2,721,186; 2,738,154 and 2,738,512). To produce plastics with improved flame-resistance, these formoses or formitols are advantageously used in combination with aminoplast formers and/or phosphites (German Offenlegungsschriften Nos. 2,738,513 and 2,738,532). Solutions of polyisocyanate polyaddition products, in particular of polyurethane ureas containing ionic groups and/or of polyhydrazodicarbonamides, in low molecular weight polyhydric alcohols may also be used as polyol components according to the invention (German Offenlegungsschrift No. 2,638,759).

Other low molecular weight compounds containing at least two isocyanate-reactive hydrogen atoms, useful according to the instant invention, include chain-lengthening agents such as 1-mercapto-3-aminopropane; substituted or unsubstituted amino acids, e.g., glycine, alanine, valine, serine and lysine: and substituted or unsubstituted dicarboxylic acids, such as succinic acid, adipic acid, phthalic acid, 4-hydroxyphthalic acid or 4-aminophthalic acid.

Compounds which are monofunctional in their reactions with isocyanates may also be used in proportions of from 0.01 to 10%, by weight, based on the polyurethane solid content, to serve as so-called chain breakers. Examples of such monofunctional compounds include monoamines, such as butylamine and dibutylamine, octylamine, stearylamine, N-methylstearylamine, pyrrolidine, piperidine and cyclohexylamine: monohydric alcohols, such as butanol, 2-ethylhexanol, octanol and dodecanol: and the various amyl alcohols, cyclohexanol and ethylene glycol monoethylether.

Blowing agents optionally used for the second and optionally, if used, the third reaction mixtures include water and/or readily-volatile inorganic or organic substances. Examples of organic blowing agents include acetone: ethyl acetate: halogen-substituted alkanes, such as methylene chloride, chloroform, ethylidene chloride, vinylidene chloride, monofluorotrichloromethane, chlorodifluoromethane and dichlorodifluoromethane; butane; hexane; heptane; and diethylether. Compounds which decompose at temperatures above room temperature with the liberation of gases, such as nitrogen, e.g., azo compounds, such as azo dicarbonamide or azoisobutyric acid nitrile, as well as inorganic blowing agents, such as air, $CO_2$ and $N_2O$ may also be used. Further examples of blowing agents and details concerning their use are given in Kunststoff-Handbuch, Volume VII, e.g., on pages 108 and 109, 453 to 455, and 507 to 510.

The usual auxiliary agents and additives of polyurethane chemistry may be added to the reaction mixtures used according to the invention.

Urethanes and/or isocyanurate catalysts of known type, such as those described in German Offenlegungsschrift No. 2,737,951 (pages 32 and 33) and in Kunststoff-Handbuch, Volume VII, e.g., on pages 96 to 102, may be used in quantities of generally 0.001 to 10%, by weight, based on the total quantity of compounds having at least two isocyanate-reactive hydrogen atoms. Also, surface active additives, such as emulsifiers and foam stabilizers, reaction retarders (for example, see German Offenlegungsschrift No. 2,373,951, page 34, for a description of some of these additives), cell regulators, reaction retarders, stabilizers, flame retarding substances, plasticizers, dyes, fillers and fungistatic and bacteriostatic substances may optionally be used according to the invention (see Kunststoff-Handbuch, Volume VII, e.g., on pages 103 to 113).

In the process according to the present invention, the reaction mixtures are introduced at intervals, into a closed mold with an internal release agent generally being added in the presence or absence of an external release agent to the first reaction mixture (see, e.g., U.S. Pat. Nos. 3,726,952; 4,024,090: 4,033,912; 4,058,492; 4,098,731 and 4,588,537, German Offenlegungsschrift No. 2,307,589 and British Patent No. 1,365,215). An internal mold release agent of the special type indicated is then added to the reaction mixture of the second and optional third charges.

In the FIGURE, the mold wall is designated 1. The foamed product of the first reaction mixture is identified as 2, while the product of the second reaction mixture is identified as 3.

The products of this process may be used, for example, as constructional parts in the manufacture of motor vehicles, furniture and electronic apparatus, as well as in phonograph equipment All quantities and percentages in the Following examples are by weight unless otherwise indicated.

EXAMPLES

In Examples 1 through 5 and Comparison Examples 1 and 2, the following procedure was employed:

A first reaction mixture, selected from Formulations 1 through 5, was prepared from a polyol from Polyol Components 1 through 3, an isocyanate from Isocyanates 1 and 2, and a blowing agent from those listed, and introduced using a high pressure dosing installation, into the cavity of a metal mold of 1650 cm$^3$ capacity which had been coated with an external mold release agent which has been dissolved in a suitable solvent. About one minute later, a second reaction mixture, Formulation 8, prepared from Polyol Component 6 and Isocyanate Component 3 was introduced into the mold using the high pressure dosing installation. After solidification of the composite part, the part was removed from the mold and observation on its release and measurement of its properties were made, as shown in Table I.

For comparison, Formulation 1 was employed as the first reaction mixture and Formulations 6 and 7 were employed, respectively, in Comparison Examples 1 and 2, which were prepared using the process described above.

The specific conditions of each process were as follows:

Polyol Component 2

28.8% of trimethylolpropane-ethylene oxide adduct (OH number of 550),
6.9% of adipic acid/phthalic acid anhydride-oleic acid-trimethylolpropane-polyester (OH number of 385) of Polyol Component 1,
2.1% of polyester of 6 mols of oleic acid, 1 mol of adipic acid, and 2.5 mols of pentaerythritol (OH number of 45),
0.4% of amine activator (Desmorapid ® DB of BAYER AG, Germany)
0.6% of polysiloxane-polyalkylene oxide polymer (stabilizer OS 50 of BAYER AG, Germany)
51.2% of aluminum hydroxide (Al(OH)3), and
10% of ammonium-polyphosphate,
OH number: 186;
Viscosity at 25° C.: 23,000 mPa's.

Polyol Component 3

43.1% of trimethylolpropane-propylene oxide adduct (OH number of 650),
26.0% of trimethylolpropane-propylene oxide adduct (OH number of 380),
2.8% of propylene oxide-ethylene oxide-polyether (82.5% PO; 17,5EO) started on trimethylolpropane (OH number of 35),
19.3% of styrene-acrylonitrile-copolymer (styrene: acrylonitrile = 1:4)
4.3% of oleate of 1 mol of oleic acid and 1 mol of 3-dimethylaminopropylamine-1,
1.6% of amine activator (Desmorapid° VP PU 3144 of BAYER AG, Germany)
2.9% of polysiloxane/polyalkylene oxide copolymer (stabilizer mixture of Polyol Component 1)

| Example | 1 | 2 | 3 | 4 | 5 | 6 | Comparison Example 1 | Comparison Example 2 |
|---|---|---|---|---|---|---|---|---|
| Raw materials (first charge °C.) | A(*)/B(**): 29/31 | 28/33 | 29/30 | 31/33 | 32/34 | 33/35 | | |
| temperature (second charge °C.) | A(*)/B(**): 42/38 | 44/45 | 42/43 | 46/48 | 47/49 | 44/49 | | |
| Mold temperature (°C.) | 72 | 70 | 71 | 70 | 70 | 71 | Comp. Table 1 | Comp. Table 1 |
| Mixing pressure (bar) | 175 | 180 | 235 | 172 | 170 | 215 | | |
| Molding time (min) | 6 | 6 | 6 | 5 | 6 | 6 | | |

Acmosil ®, a sales product of ACMOS, Germany was used as external mold release agent.
(*) A = Polyol Component
(**) B = Isocyanate Component

Polyol Component 1

43% of propylene oxide-polyether started on ethylene diamine (OH number of 630),
8.5% of trimethylol propane-propylene oxide adduct (OH number of 930),
27% of propylene oxide-ethylene oxide-polyether (75% PO, 25%; EO) started on trimethylolpropane (OH number of 35),
17.5% of polyester of adipic acid (10%), phthalic acid anhydride (21%), oleic acid (20%), and trimethylolpropane (49%) (OH number of 385),
1.7% of oleate of 1 mol of oleic acid +1 mol of 3-dimethylaminopropylamine-1, and
2.3% of polysiloxane-polyalkylene oxide copolymer (1:1 mixture of stabilizers OS 50 and OS 720 of BAYER AG, Germany),
OH number: 427;
Viscosity at 25° C.: 6000 mPa's.

OH number: 380;
Viscosity at 25° C.: 5600 mPa's.

Polyol Component 4

78.4% of trimethylolpropane/propylene oxide adduct (OH number of 550),
13.8% of diethanolamine,
0.9% of polysiloxane/polyalkylene oxide copolymer (stabilizer OS 720 of BAYER AG, Germany)
0.9% of dibutyl-tin-dilaurate, and
6.0% of a non-reactive brown pigment made up into a paste with trimethylol-ethylene oxide adduct (OH number 460)
OH number: 606;
Viscosity at 25° C.: 2000 mPa's.

Polyol Component 5

44.8% of trimethylolpropane/propylene oxide adduct (OH number of 850), 44.8% of trimethylolpropane/propylene oxide adduct (OH number of 550),
1.8% of polysiloxane/polyalkylene oxide copolymer (stabilizer OS 720 of BAYER AG, Germany)
2.8% of polyalkyl-tin-polycarboxylate, and
5.8% of brown pigment made up into a paste with trimethylolpropane-ethylene oxide adduct (OH number of 460),
OH number: 655;
Viscosity at 25° C.: 3,000 mPa's.

Polyol Component 6

39.5% of trimethylolpropane/propylene oxide adduct (OH number of 850),
39.5% of trimethylolpropane/propylene oxide adduct (OH number of 550),
7.9% of hydroxypolysiloxane (OH number of 100)
1.6% of polysiloxane/polyalkylene oxide copolymer (stabilizer OS 720 of BAYER AG, Germany)
4.0% of 50% solution of sodium aluminosilicate in castor oil (OH number of 90),
2.4% of dibutyl-tin-dilaurate,
5.1% of a non-reactive brown pigment made up to a paste in trimethylol-propane/ethylene oxide adduct (OH number of 460)
OH number: 588;
Viscosity at 25° C.: 3,800 mPa's.

Isocyanate Component 1

Polyphenylpolymethylenepolyisocyanate (crude MDI)
Isocyanate content of 31%
Viscosity at 25° C. of 130 mPa.s Isocyanate Component 2

39.5% of isocyanate component 1,
50.5% of aluminum hydroxide,
9.5% of ammonium polyphosphate, and
0.5% of sodium aluminosilicate
Isocyanate content of 12.24%
Viscosity at 25° C. of 18,000 mPa.s Isocyanate Component 3

50% of trimerized hexamethylene diisocyanate (isocyanate content of 21.5%), and
50% of isophorone diisocyanate (isocyanate content of 37.8%)

Blowing agents for the first reaction mixture 0.6, 1.2 and 3% of water (based on the polyol component) or
1% of pyrocarbonic acid diethyl- or dimethylester (based on the isocyanate component) or
10% of isophthalic acid-bis-carbonic acid ethyl ester anhydride (based on the isocyanate component).

Formulation 1:

| |
|---|
| 100 parts, by weight, of polyol component 1 |
| 1.2 parts, by weight, of water |
| 134 parts, by weight of isocyanate component 1 |

Formulation 2:

| |
|---|
| 100 parts, by weight, of polyol component 1 |
| 114 parts, by weight, of isocyanate component 1 |
| 1.2 parts, by weight, of pyrocarbonic acid dimethyl ester |

Formulation 3:

| |
|---|
| 100 parts, by weight, of polyol component 1 |
| 0.6 parts, by weight, of water |
| 124 parts, by weight, of isocyanate component 1 |
| 13 parts, by weight, of isophthalic acid-bis-carbonic acid ethyl ester anhydride |

Formulation 4:

| |
|---|
| 100 parts, by weight, of polyol component 2 |
| 1.2 parts, by weight, of water |
| 175 parts, by weight, of isocyanate component 2 |

Formulation 5:

| |
|---|
| 100 parts, by weight, of polyol component 3 |
| 1.2 parts, by weight, of water |
| 120 parts, by weight, of isocyanate component 1 |

Formulation 6 (comparision formulation):

| |
|---|
| 100 parts, by weight, of polyol component 4 |
| 168 parts, by weight, of isocyanate component 3 |

Formulation 7 (comparison formulation):

| |
|---|
| 100 parts, by weight, of polyol component 5 |
| 182 parts, by weight, of isocyanate component 3 |

Formulation 8:

| |
|---|
| 100 parts, by weight, of polyol component 6 |
| 163 parts, by weight, of isocyanate component 3 |

The experimental results are shown in Table 1.

TABLE 1

| Example | 1st mixture (core) | 2nd mixture (outer layer) | Average density of part (g/cm³) | Release from mold | Surface Hardness Shore D | Surface quality | Special features |
|---|---|---|---|---|---|---|---|
| Comparison 1 | Formulation 1 549 g | Formulation 6 396 g | 0.6 | Adherence & destruction of composite part | — | — | — |
| 1 | Formulation 1 594 g | Formulation 8 396 g | 0.6 | faultless | 81–82 | Lightfast, colorfast, weather resistant outer layer* | |
| 2 | Formulation 2 | Formulation 8 | 0.8 | " | 81–82 | Lightfast, colorfast, | Free from distortion when |

TABLE 1-continued

| Example | 1st mixture (core) | 2nd mixture (outer layer) | Average density of part (g/cm³) | Release from mold | Surface Hardness Shore D | Surface quality | Special features |
|---|---|---|---|---|---|---|---|
| | 594 g | 396 g | | | | weather resistant outer layer* | covered on one side only |
| 3 | Formulation 2 594 g | Formulation 8 396 g | 0.6 | " | 81–82 | Lightfast, colorfast, weather resistant outer layer* | |
| 4 | Formulation 3 594 g | Formulation 8 396 g | 0.6 | " | 81–82 | Lightfast, colorfast, weather resistant outer layer* | |
| 5 | Formulation 5 594 g | Formulation 8 396 g | 0.6 | " | 81–82 | Lightfast, colorfast, weather resistant outer layer* | Plastic part has no tendency to distort |
| Comparison 2 | Formulation 1 | Formulation 7 | 0.6 | Adherence & destruction of composite part | 81–82 | — | |

*Weatherometer: 98% residual gloss according to Gardner after 2000 hours
Xenotest: No color variations, no loss of gloss after 500 hours Xeno-test 1200

What is claimed is:

1. A process for the production of a lightfast and colorfast composite part of cellular plastics by the successive introduction of reaction mixtures into a closed mold with a rigid cavity, such that the first mixture is foamable and is introduced into the cavity, then a second reaction mixture is introduced into the cavity, after the first mixture has at least become resistant to permeation, but is still compressible, such that the second reaction mixture surrounds the first mixture and compresses it, characterized in that A. the first reaction mixture comprises aromatic isocyanates having isocyanate contents of from 5 to 50%, by weight: one or more compounds with molecular weights of from 32 to 10,000, which contain at least two isocyanate-reactive hydrogen atoms, such that the equivalent ratio of isocyanate to compounds containing isocyanate-reactive hydrogen atoms is from 0.8:1 to 5:1: and from 0.1 to 20%, by weight, (based on the reaction mixture), of a blowing agent comprising a compound which releases $CO_2$; and B. the second reaction mixture comprises aliphatic, cycloaliphatic, or a combination of aliphatic and cycloaliphatic polyisocyanates having isocyanate contents of from 10 to 50%, by weight: one or more compounds with molecular weights of from 32 to 10,000, which contain at least two isocyanate-reactive hydrogen atoms, such that the equivalent ratio of isocyanates to compounds containing isocyanate-reactive hydrogen atoms is from 0.8:1 to 5:1; and an internal mold release agent selected from the group consisting of polysiloxane, hydroxypolysiloxanes or salts of polysiloxanes containing amino groups with long chain fatty acids.

2. A process according to claim 1, characterized in that three reaction mixtures are introduced into the closed mold, such that after the second reaction mixture has become resistant to permeation, but is still compressible, a third reaction mixture is introduced into the cavity, such that said third mixture surrounds the second mixture and compresses it, and said mixture is the same as or different from the second mixture and comprises aliphatic, cycloaliphatic, or a combination of aliphatic and cycloaliphatic polyisocyanates having isocyanate contents of from 10 to 50%, by weight: one or more compounds with molecular weights of from 32 to 10,000 which contain at least two isocyanate-reactive hydrogen atoms, such that the equivalent ratio of isocyanates to compounds containing isocyanate-reactive hydrogen atoms is from 0.8:1 to 5:1; and an internal mold release agent consisting of polysiloxanes, hydroxypolysiloxanes or salts of polysiloxanes, containing amino groups with long chain fatty acids.

3. A process according to claim 1, characterized in that the first reaction mixture additionally includes conventional auxiliary agents and additives.

4. A process according to claim 1, characterized in that the second reaction mixture includes conventional auxiliary agents and additives.

5. A process according to claim 2, characterized in that the third reaction mixture includes conventional auxiliary agents and additives.

6. A process according to claim 1, characterized in that the first reaction mixture includes an internal mold release agent.

7. A process according to claim 1, characterized in that the second reaction mixture is foamable and contains a blowing agent.

8. A process according to claim 2, characterized in that the third reaction mixture is foamable and contains a blowing agent.

9. A process according to claim 1, characterized in that the first reaction mixture contains from 0.1 to 10%, by weight (based on the reaction mixture) of water, as a blowing agent.

10. A process according to claim 1, characterized in that a zeolite dehydrating agent is added to the second reaction mixture.

11. A process according to claim 2, characterized in that a zeolite dehydrating agent is added to the third reaction mixture.

* * * * *